July 19, 1927.
A. AMES, JR
1,636,450
OPTICAL AID TO THE VISUAL PERCEPTION OF DEPTH OR ROTUNDITY
Filed May 26, 1924
Fig. 1
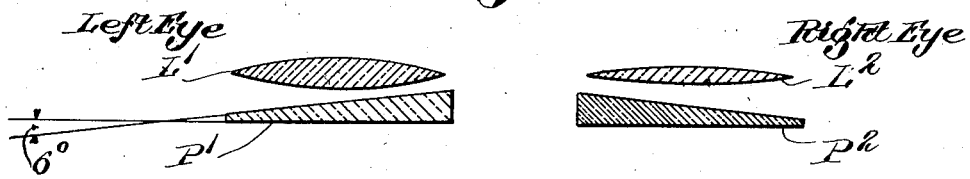
Fig. 2
Fig. 3
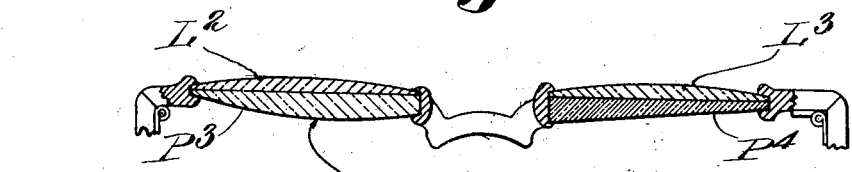
Cylindrical prism, axis vertical
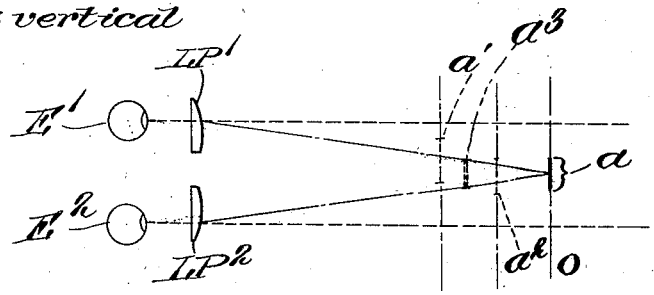
Fig. 4
Inventor
Adelbert Ames Jr.
by Roberts, Roberts & Cushman
his Attys.

Patented July 19, 1927.

1,636,450

UNITED STATES PATENT OFFICE.

ADELBERT AMES, JR., OF HANOVER, NEW HAMPSHIRE.

OPTICAL AID TO THE VISUAL PERCEPTION OF DEPTH OR ROTUNDITY.

Application filed May 26, 1924. Serial No. 715,821.

This invention relates to the provision of optical aids to normal vision for the purpose of increasing the perception of depth or rotundity in the visualized object, and for producing an illusion of depth, rotundity or stereoscopic effect in the sensory perception of plane pictures, such as screen-projections, drawings or photographs, not actually stereoscopic or really illusive of binocular effect.

The sense-impression of rotundity by visual perception is an exceedingly complex phenomenon, of which the known contributing sensory impulses comprise unconscious sensory perceptions of the axial direction of the eyes; of the accommodative or focussing stress; of the geometrical likeness or difference in the component monocular images of a binocular sensory composite; and of the character of certain monocular optical aberrations and distortions characteristic of comparative distances of the object in relation to the visual fixation; (and some other more recondite factors).

Repetition and experience with vision have stored up in the memory of the normal human data for an unwilled, automatic and instantaneous inference about and evaluation of visual sensory impressions as testifying to the form, distance and relative place of objects, the resultant inference being based on these sensory optical impressions. This automatic and customary inference of the actualities of something seen is by experience so reliable as to be indefeasibly convincing; as the proverb puts it, seeing is believing.

In the graphic arts, including photography, the visual perceptive faculties are appealed to to infer realities, including depth and rotundity, from a picture or image quite consciously false, but having one or more qualities at least reminiscent of the true appearance of an object in three dimensions. The strength of the illusion may be said to rest upon the success with which the representation or picture deludes the eye into belief that its plane surface has the same appearance as the objects would have if they were actually three-dimensional.

The principle of the invention about to be explained rests in so interfering with the normal relationship between the two eyes, by suitable optical apparatus, as to cause the automatic sense-inferences of the binocular impression to testify to an illusory depth or rotundity in the object viewed. Monocular pictures, such as ordinary photographs from one point of view may thus be perceived as if they were stereoscopic, and objects of confusing character difficult to see (such as the works of a watch) may be viewed in exaggerated relief. The effect produced is, of course, unreal and subjective, but is nevertheless in aid of the intentions of deception of the picture, or of aid to a willed analytical perception of a visually-confusing object actually three-dimensional, such as the watch-works adverted to above.

The apparatus employed may comprise eye-glasses or spectacles adapted respectively to alter the coordination of the eyes by the modification of the direction of the viewing axis of one or both eyes; by differently modifying the optical characteristics of the image of the eyes severally, or by altering the aberrations and diffusions of one eye selectively, or by altering the color or value of the perception of one eye in relation to the other; or, as preferred, by a combination of two or more of such optical alterations of normal vision.

In the accompanying drawings, which illustrate explanatory instances only of the genus of apparatus comprised in the invention, Fig. 1 is an explanatory diagram in horizontal section explanatory of the lenses of one type of eye-glasses according to the invention;

Fig. 2 is a horizontal section of a practical form of eye-glasses according to Fig. 1;

Fig. 3 is a similar section of a different species of eye-glasses according to the invention; and Fig. 4 is an explanatory diagram in plan.

Let it be assumed that the object is a plane picture O, Fig. 4, having a foreground representation at $a$ in its field. If now, referring to Figs. 1 and 4, the left eye $E^1$ be provided with image-modifying means such as the positive spherical lens $L^1$ of a certain equivalent radius of curvature, the accommodation of eye $E^1$ in respect to object O will be relaxed; the eye lens will be flatter at a given distance of O than if there were no lens $L^1$ interposed. If now a plane prism $P^1$ also be interposed, base inward, before the left eye $E^1$, the direction of the axis of eye $E^1$, in respect to convergence with the right eye $E^2$ will be altered. For fixation on $a$, at a normal attentive distance, an alteration such as effected by a flint glass prism having an angle of about 6° of arc will suffice to cause eye $E^1$ to take the normal axial position it would have if $a$ were infinitely distant. Suppose now the right eye $E^2$ is provided with a prism $P^2$ similar to $P^1$, symmetrically placed, and a spherical lens $L^2$ of twice the equivalent radius of curvature of lens $L^1$; then both eyes will be relaxed in convergence, and in their accommodations. As a matter of sensory impression, due to the mentioned prisms and lenses, the position of the picture in space will be indeterminate, for the relaxed convergence (or, in some cases, actual divergence) prevents any corrective impression arising from perception of the coordinate position of the axes; and the differently relaxed accommodations prevent any sensory ascertaining of distances by accommodative stress. The stronger lens at the left eye causes a blurred image on that retina, from which the perceptive intelligence selects a suitable portion for combination with the better defined right eye image to correspond to a binocular composite representative of an object positioned somewhere in space, for example at $a^3$, Fig. 4. This might be at any position in space, nearer or further than the real object, depending upon the characteristic of the lines, edges, light and shade of the object appealing to the sensory memory of the particular observer. The nervous visual reactions effect a binocular compromise readily; the object is visualized plainly, but the memorized impression of distance arising from the axial positions of the eyes and the monocular aberrations are profoundly confused; it will be found that the object O is no longer perceived to be a plane.

If now one of the optical elements, $P^2$, $L^2$ be tinted, as shown at $P^2$, so as to provide a further character of difference in the respective monocular perceptions, the failure to perceive the distance of the object O will be more complete. While the whole picture is visualized, the actual effect in the eyes is to permit the imagination, without countervailing sense-impression, to assign a part of the picture to the position in space which corresponds to the virtual left-eye image at $a^1$, and other parts to the position in space which corresponds to the virtual right-eye image at $a^2$, or to compromise positions between these apparent different positions. The net perceptive result is to free the observer from any compulsory suggestion arising from actual perceptive sensations and compelling belief that the arrangement of line and light and shade before him lie in any one plane. The invariable reaction is to cause the picture objects to appear in the near and far relation suggested by their sizes, shadows, and perspective or aerial perspective of representation.

For convenience, referring to Fig. 2, the apparatus may be mounted in any usual eyeglass frame, and the lenses $LP^1$ and $LP^2$ may be single pieces of glass comprising a convex front surface and a plane rear surface at the appropriate prismatic angle, lens $LP^2$ being shaded or tinted.

Referring to Fig. 3, a preferred form of the device further increases what may be referred to as the release of the perceptions from compulsory truth by providing a selective aberration for one eye not affecting the other. The left eye, for example, is provided with a combination of spherical (plano-convex) lens $L^2$ and a cylindrical prism $P^3$ having a vertical axis.

In the stereoscopic effect produced by an actual scene, the displacement of the image on non-corresponding points of the two eyes is always in a horizontal direction due to the fact that our eyes are displaced from each other in a horizontal direction. There is no displacement of the images in a vertical direction.

Where the images are blurred by a spherical lens, they are blurred in all directions. A convex cylinder with its axis in a vertical position blurs the image in a horizontal direction only. It therefore more nearly reproduces the effect of binocular vision. By blurring only the vertical lines, and leaving the horizontal lines sharp, the blurred and sharp monocular perceptions of the eyes severally are caused to coalesce into one impression with greater readiness.

A convex cylinder of six diopters used alone for one eye, for example, produces a very marked stereoscopic effect on the perception of a photograph held in the hand.

It will now be apparent that the particular optical structures recommended may be much varied without foregoing the operative effect of the apparatus.

When the apparatus is used with objects actually of three dimensions, the effect may best be described as reinforcing attention to a monocular image by rendering its coordinate and complementary image illusory, but nevertheless permitting the coordinate image to point and emphasize depth distinctions. The gain is from a permitted concentration of attention.

I claim:

1. Apparatus for aiding the visual perception of depth comprising binocular refracting means, the optical system for one eye only being adapted to alter the normal mutual relations of convergence of the respective optical axes, and the system as a whole comprising devices for optical alteration of the visual constants of both eyes and being adapted to prevent perception of coincident normal binocular sense impressions and substitute a coincident impression free from true indications of depth.

2. Apparatus for aiding the visual perception of depth comprising binocular refracting means, the optical system for one eye being adapted to alter the normal mutual relations of illumination of the eyes and of convergence of the respective optical axes, and the system as a whole being adapted to prevent perception of coincident normal binocular sense impressions and substitute a coincident impression free from true indications of depth.

3. Optical means for altering the normal coordinate axial position of the eyes in binocular vision, for the purpose of aiding the perception of depth, comprising means for modifying the normal axial position in mutual convergence of one eye, in combination with means for altering the accommodation of the other eye.

4. Optical means for altering the normal coordination of the eyes in binocular vision for the purpose of aiding perception of an illusion of depth in a flat object having in combination means cooperating with each eye to relax the normal axial convergence, and means cooperating with one or both eyes for relaxing the ocular accommodation and means for subjecting the sense impression from one eye to qualification of amount or color of illumination different from the permitted effect in the other eye.

5. Optical means for altering the normal coordination of the eyes in binocular vision for the purpose of aiding perception of an illusion of depth in a flat object having a combination, means cooperating with one eye to aberrate its image selectively in one dimension and means cooperating with one or both eyes for preventing similarity of accommodative reaction, and means for subjecting the sense impressions from one eye to qualifications of amount or color of illumination different from the permitted effect in the other eye.

6. Optical means for altering the normal coordination of the eyes in binocular vision for the purpose of aiding perception of an illusion of depth in a flat object having in combination a cylindrical lens for aberrating sharp images of vertical lines in one eye, and means causing the normal axial convergence on the object to be relaxed.

7. Optical means for altering the normal coordination of the eyes in binocular vision for the purpose of aiding perception of an illusion of depth in a flat object having in combination a cylindrical lens for aberrating sharp images of vertical lines in one eye, and means causing the normal axial convergence on the object to be relaxed, in combination with means for qualifying the amount of illumination of the image in one eye.

8. Optical apparatus comprising binocular eye-glasses having refracting means for the eyes severally differently effective on the unaided eye in respect to modification of the apparent position of coordinate images from the same object, in respect to relaxation of the accommodative effort required of the eye, and in respect to transmission unchanged as regards color or intensity of the incident light, whereby perception of the object field is prevented from causing associative perception of distance or comparative distance in the line of sight.

9. Apparatus for aiding the visual perception of depth comprising binocular refracting means, the optical system for one eye being adapted to provide a relatively blurred image and the system for the other eye being adapted to provide a relatively sharp image, in combination with other refractive means for confusing the normal binocular sense perception of distance of the object.

10. Apparatus for aiding the visual perception of depth comprising binocular refracting means, the optical system for one eye being adapted to provide an image laterally blurred and vertically sharp, and the system for the other eye being adapted to provide a relatively sharp image, the said optical systems mutually providing means for confusing the normal binocular sense perception of distance of the object.

Signed by me at Boston, Massachusetts, this twenty-third day of May, 1924.

ADELBERT AMES, Jr.